United States Patent [19]
Köster

[11] 3,900,787
[45] Aug. 19, 1975

[54] ADAPTER FOR AUTOMATICALLY ADAPTING DC EQUIPMENT FOR ENERGIZATION BY A FIRST OR SECOND AC VOLTAGE OF DIFFERENT AMPLITUDES

[75] Inventor: Manfred Köster, Kronberg, Taunus, Germany

[73] Assignee: Braun Aktiengesellschaft, Frankfurt am Main, Germany

[22] Filed: Mar. 21, 1974

[21] Appl. No.: 453,372

[30]   Foreign Application Priority Data
  Mar. 22, 1973  Germany............................ 2314220
  Sept. 17, 1973  Germany............................ 2346775

[52] U.S. Cl. ............................................. 321/15
[51] Int. Cl.² ........................................ H02M 7/19
[58] Field of Search ........ 321/8 R, 15; 307/87, 151; 320/1

[56]      References Cited
          UNITED STATES PATENTS
2,286,499  6/1942  Mittelmann...................... 321/15
3,713,018  1/1973  Tscheuschner...................... 321/15
3,728,610  9/1970  Switsen.............................. 321/15
3,733,541  5/1973  Elms................................. 321/15

OTHER PUBLICATIONS (S 2754–0110), Cielo et al., "Direct Line and Doubler Rectifier Assembly," IBM Technical Disclosure Bulletin, Vol. 14, No. 3, p. 708, Aug. 1971.

*Primary Examiner*—William H. Beha, Jr.
*Attorney, Agent, or Firm*—Michael S. Striker

[57]           ABSTRACT

DC equipment requiring a determined operating voltage is adapted for energization by a first AC voltage, or a second AC voltage having twice the amplitude of the first AC voltage. Rectifiers rectify the AC voltage and charge an output capacitor connected across the terminals furnishing the operating voltage. A voltage doubler capacitor is provided as is a thyristor which is responsive to a second rectified voltage and connects the voltage doubler capacitor to the rectifier-output capacitor circuit for voltage doubling purposes when the AC voltage is the first AC voltage. A number of full-wave and half-wave arrangements are shown.

19 Claims, 4 Drawing Figures

ADAPTER FOR AUTOMATICALLY ADAPTING DC EQUIPMENT FOR ENERGIZATION BY A FIRST OR SECOND AC VOLTAGE OF DIFFERENT AMPLITUDES

BACKGROUND OF THE INVENTION

The present invention comprises a method and system for automatically adapting DC equipment requiring a determined DC operating voltage to be energized from a first voltage source or a second voltage source furnishing an AC voltage twice the amplitude of said first voltage source.

Systems are known in which small electrical loads automatically adjust to different line voltages. For this purpose the known systems utilize either a phase control arrangement or voltage drop resistors which are automatically connected in series with the equipment. In this type of system, a portion of the line voltage is eliminated when the line voltage is the higher of the two line voltages. This of course causes the equipment to be designed for an operating voltage corresponding to the lowest line voltage. These arrangements have the disadvantage that it is easy to destroy the equipment upon failure of the adapting system when the higher line voltage is applied. Further, of course power loss occurs in the resistors inserted in series with the load while the phase control arrangements generally result in a high reactive power being generated. In the case of, for example, electric shavers this high reactive power can serve to blow the fuse in the line socket.

SUMMARY OF THE INVENTION

It is an object of the present invention to furnish a method and system which allows equipment requiring a determined DC operating voltage to be energized by a first or a second AC voltage, where the amplitude of the second AC voltage is twice that of the first AC voltage. It is a further object of this invention to furnish such a system and method and in which only very low reactive power is drawn and no power loss occurs.

In accordance with the present invention, the operating voltage required by the equipment corresponds to the higher line voltage and the lower line voltage is automatically adjusted to the value of the higher voltage by voltage doubling.

Under these circumstances of course the equipment cannot be destroyed when applied to the higher line voltage in case of failure of the adapting equipment and neither an additional power loss nor the drawing of reactive power from the line occurs.

The present invention thus constitutes an adaptor system for automatically adjusting equipment requiring a determined DC operating voltage to be energized by a first and a second AC voltage, said second AC voltage having two times the amplitude of said first AC voltage. It comprises rectifier means for rectifying the AC voltage energizing said equipment and furnishing a corresponding DC voltage. If further comprises voltage doubler circuit means for doubling said corresponding DC voltage when connected to said rectifying means. Finally, voltage responsive circuit means are provided which are responsive to the AC voltage energizing the equipment and connect said voltage doubler circuit means to said rectifier means when said AC voltage is said first AC voltage and disconnect said voltage doubler circuit means from said rectifier means when said AC voltage is said second AC voltage.

In a preferred embodiment of the present invention, the adapter system has a first and second input terminal for receiving said AC voltage and a first and second output terminal for furnishing said DC operating voltage. The output rectifier means comprise a first and second diode, said first diode having a cathode connected to said first input terminal and an anode connected to said first output terminal. The second diode has an anode connected to said second input terminal and a cathode connected to said second output terminal. A capacitor is connected from said first to said second output terminal. The voltage doubler circuit means comprise a voltage doubler capacitor having one terminal connected to said first input terminal and a second terminal connected to said first output terminal. It is thus connected in parallel with said first diode. A thyristor, which forms part of the voltage responsive circuit means has an anode-cathode circuit connected between said second terminal of said voltage doubler capacitor and said second input terminal. The gate of the thyristor is controlled in such a manner that the thyristor is conductive, connecting said voltage doubler capacitor to said output rectifier means when said AC voltage is said first AC voltage and the thyristor is non-conductive when said AC voltage is said second AC voltage.

In a preferred embodiment of the present invention input rectifier means furnish a DC voltage corresponding to the AC voltage energizing said equipment and comprise a first and second voltage divider having a first and second voltage divider tap respectively. When the AC voltage applied at the first and second input terminal is said first AC voltage, a voltage appears at said second voltage divider tap which is connected to said gate of said thyristor, causing said thyristor to become conductive. When the voltage at the input terminals is said second AC voltage, the voltage at said first voltage divider tap is sufficiently high to cause an electronic switch to become conductive which short-circuits said second voltage divider tap to the second input terminal. Under these circumstances the gate of the thyristor is connected to its cathode causing said thyristor to become non-conductive. In a preferred embodiment of the present invention, the input rectifier means comprise a diode connected with the same polarity as said thyristor relative to said first and second input terminals.

In a further preferred embodiment of the present invention the switching means which short-circuit the thyristor gate to its cathode comprise a transistor whose emitter-collector circuit is connected from said gate to said cathode and whose base is connected to said first voltage divider tap. Further, said second voltage divider comprises a resistor and a capacitor, said emitter-collector circuit of said transistor being connected in parallel with said capacitor.

In a further preferred embodiment of the present invention a glow tube is connected between said second voltage divider tap and said gate of said thyristor.

In a further preferred embodiment of the present invention, the emitter-collector circuit of said transistor is further connected in parallel with a circuit comprising a diode having the same polarity as said thyristor relative to said input terminals and a further resistor-capacitor parallel circuit connected in series with said diode. It is the purpose of this additional RC circuit to stabilize the circuit relative to undesired firings of the thyristor. Use of this circuit assures that even when the second AC voltage is applied to the input terminals and the contacts are possibly intermittent, no ignition of the thyristor will occur.

In further preferred embodiments of the present invention, the half-wave rectification described above is converted to a full-wave rectification by connecting two similar arrangements as described above in parallel.

It is the advantage of such full-wave arrangements that for the same capacity of the output capacitor, twice the energy may be transferred from line to the DC equipment to be energized.

It is possible that an overvoltage may arise at the output terminals of the adapter, and thus be applied to the equipment, if a very rapid change of the AC energizing voltage from the first to the second voltage, that is for example, from 110 volts to 220 volts occurs. For example, if a very rapid change of voltage occurs while the voltage doubling capacitor is being charged in a particular half-wave, the voltage doubler capacitor will be charged to this higher line voltage during this half-wave and, when the polarity of the input voltage changes sign, a voltage corresponding to twice the DC operating voltage will appear across the output capacitor during the next half-wave of the line voltage.

A further preferred embodiment of the present invention not only decreases the possibility of the above-described overvoltages but also eliminates the need for a capacitor forming part of the input rectifier means of the arrangement described above. In this embodiment, the output rectifier means in series with the output capacitor are connected from the first to the second input terminal of the adapter. The voltage doubling capacitor is connected in series with a further diode from the first to the second input terminal. The anode-cathode circuit of a thyristor then connects the voltage doubler capacitor to the output capacitor when the first AC voltage is applied to the input terminals. When the voltage applied at the input teminals is the second AC voltage, the voltage responsive circuit controls the gate of the thyristor in such a manner that the thyristor is non-conductive, whereby the voltage doubling capacitor is disconnected from the output capacitor.

It is the advantage of the above-described arrangement that less space is required and that the maximum over voltage in the most undesirable case has an amplitude corresponding to the amplitude of the first AC voltage and not that of the second AC vq tage and lasts for one period of the line frequency only. This of course is important for protecting the components in the DC equipment being energized.

In a preferred embodiment of the latter above-described arrangement, the input rectifier means again comprise a first and second voltage divider having a first and second voltage divider tap. The first voltage divider tap is connected through a threshold type circuit element to the base of a transistor whose emitter-collector circuit again, as described relative to the first above-mentioned arrangement, short-circuits the voltage at the second voltage divider terminal to the second line terminal thereby effectively connecting the gate of the thyristor to its cathode when the input voltage is the second AC voltage. Further, in preferred embodiments of the present invention, the threshold circuit elements are Zener diodes.

In order to provide a discharge path for the voltage doubling capacitor, in a further preferred embodiment of the present invention a series circuit comprising a resistor and a diode is connected from the first input terminal to the second output terminal. This circuit provides a discharge path for the capacitor through the DC equipment after the plug has been pulled from the AC socket and at the same time no power is consumed in this circuit since under the normal circuit operating conditions the diode blocks any current from flowing through the resistor.

If the AC component at the output terminals is to be reduced, a further embodiment of the present invention provides two arrangements as described above, the input terminals of the two arrangements having reversed polarity relative to each other, but the output terminals having the same polarity. Under these conditions the output capacitor connected from the first to the second output terminal may be eliminated resulting in further reduced costs and required space.

The novel features which are considered as characteristic for the invention are set forth in particular in the appended claims. The invention itself, however, both as to the construction and its method of operation, together with additional objects and advantages thereof, will be best understood from the following description of specific embodiments when read in connection with the accompanying drawings.

Figure 1:
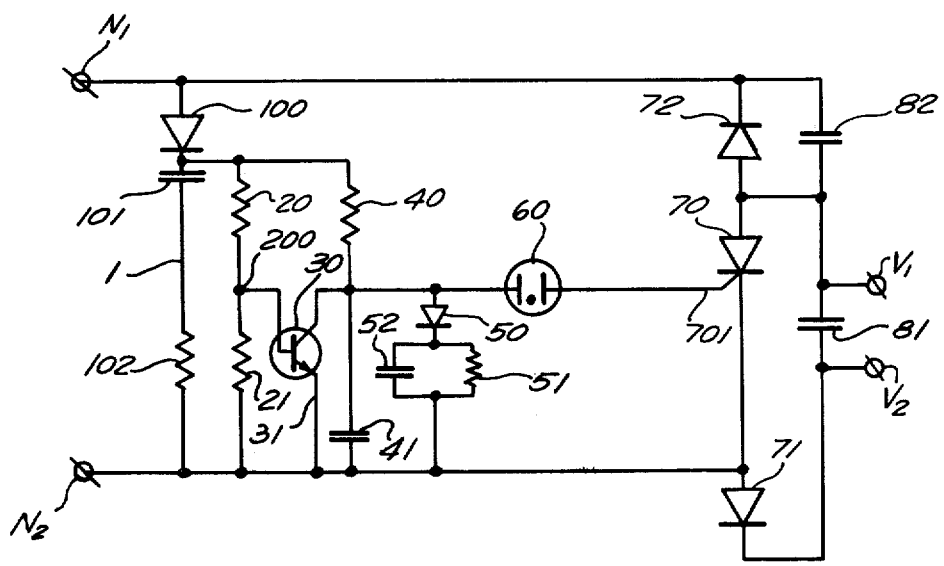
FIG. 1 is the circuit diagram of a first preferred embodiment of the present invention utilizing half-wave voltage doubling.

DESCRIPTION OF THE PREFERRED EMBODIMENTS:

A preferred embodiment of the present invention will now be described with reference to the drawing.

In FIG. 1 terminals $N_1$ and $N_2$ constitute, respectively, the first and second input terminal at which an AC voltage is to be applied. This AC voltage can either be a first AC voltage having a first amplitude or a second AC voltage having a second amplitude which is twice the amplitude of said first AC voltage. Reference numeral 1 denotes input rectifier means comprising a series circuit consisting of a rectifier 100, a capacitor 101 and a resistor 102 connected in series. First voltage divider means comprising a resistor 20 connected in series with a resistor 21 are connected in parallel with capacitor 101 and resistor 102. The common point of resistors 20 and 21, denoted by reference numeral 200 is herein referred to as the first voltage divider tap. A second voltage divider comprising a resistor 40 connected in series with a capacitor 41 is connected in parallel with the first voltage divider. The common point of resistor 40 and capacitor 41 constitutes the second voltage divider tap.

The base of a transistor 30 is connected to the first voltage divider tap, while the emitter-collector circuit of transistor 30 is connected in parallel with capacitor 41. The emitter of transistor 30 has reference numeral 31. It is connected to terminal $N_2$ while the collector is connected to the second voltage divider tap. A diode 50 has an anode connected to the second voltage divider tap and a cathode connected to a parallel RC circuit comprising a capacitor 52 and a resistor 51. The other terminal of the parallel circuit is connected to the $N_2$ input terminal. Further connected to the second voltage divider tap is a glow tube 60 whose other terminal is connected to the gate 701 of a thyristor 70. It should be noted that this circuitry so far constitutes the voltage responsive means. Specifically, as mentioned before, the series circuit of diode 100, capacitor 101 and resistor 102 constitutes input rectifier means. Further, thyristor 70 is individually referred to as switch means. The anode of thyristor 70 is connected to the anode of a diode 72 whose cathode is connected to terminal $N_1$, while the cathode of thyristor 70 is connected to the anode of a diode 71 which is also connected to input terminal $N_2$. Connected in parallel with diode 72 is a capacitor 82 herein referred to as a voltage doubling circuit means or a voltage doubling capacitor. Cathode of diode 71 is connected to one of a pair of output terminals $V_1$ and $V_2$. A capacitor 81 herein referred to as an output capacitor is connected from terminal $V_1$ to terminal $V_2$. Further, a connection exists between terminal $V_1$ and the anode of diode 72. Terminals $V_1$ and $V_2$ are herein referred to respectively as the first and second output terminal and serve to furnish the DC operating voltage to the equipment to be energized.

Assume now that AC voltage of, for example, 220 volts is connected at terminals $N_1$ and $N_2$. When terminal $N_1$ is positive, capacitor 101 is charged to a DC voltage. This DC voltage is applied to the first and second voltage dividers and, at the first voltage divider tap a portion of it is applied to the base of transistor 30. If the threshold value of this transistor is exceeded, the emitter-collector circuit becomes conductive and therefore short-circuits capacitor 41 effectively connecting the gate 701 of thyristor 70 to its cathode. Thyristor 70 therefore blocks. When terminal $N_1$ becomes negative, capacitor 81 is charged through diodes 71 and 72.

When the second AC voltage is applied to terminals $N_1$ and $N_2$, the output capacitor (capacitor 81) thus is charged to a voltage corresponding to the rectified applied AC voltage.

If however a voltage of 110 volts is applied at terminals $N_1$ and $N_2$, then transistor 30 does not become conductive. Under these conditions thyristor 70 had sufficient voltage applied at its gate to cause this thyristor to become conductive. When terminal $N_1$ is positive, capacitor 82 is charged through thyristor 70. When the input voltage changes polarity, that is when terminal $N_2$ becomes positive and $N_1$ becomes negative, the voltage across capacitor 82 is added in series to the voltage appearing from terminal $N_2$ to terminal $N_1$ causing substantially the double voltage to be applied to capacitor 81. The capacitance of capacitor 82 must be so selected that the power requirements of the equipment connected to terminals $V_1$ and $V_2$ during this half-wave are covered.

Further shown in FIG. 1 is a damping circuit connected in parallel with the emitter-collector circuit of transistor 30. It is the function of this damping circuit to make certain that thyristor 70 does not become conductive when the higher AC voltage is applied at the input terminals. This might of course occur due to some transient conditions due to poor contact. This damping circuit comprises the above-described diode 50 and the parallel resistor-capacitor circuit comprising resistor 51 and capacitor 52. The time constant of the circuit is so selected that the voltage at gate 71 of thyristor 70 does not become sufficiently higher either when the higher input voltage is first applied or during operation with said higher input voltage to cause thyristor 70 to become conductive.

Glow tube 60 serves as a switch which becomes conductive when voltage appears at the second voltage divider terminal, that is when transistor 30 is nonconductive because the lower AC voltage is applied at terminals $N_1$ and $N_2$.

Figure 2:
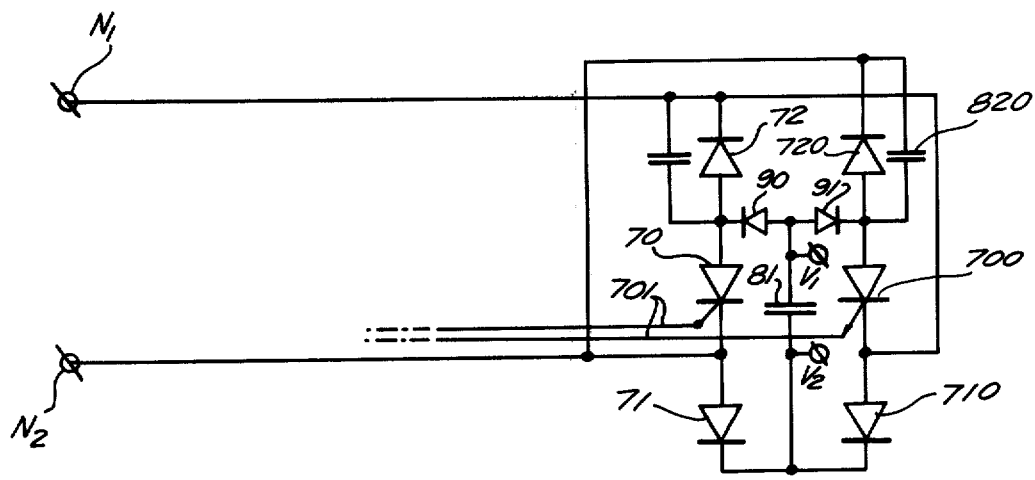
FIG. 2 is a second preferred embodiment of the present invention using full-wave voltage dougling.

If full-wave rectification and voltage doubling are desired rather than half-wave, the circuit of FIG. 2 can be utilized. It will be noted in FIG. 2 that first circuit identical to that of FIG. 1 is furnished and, arranged in parallel thereto is a second circuit also identical to that in FIG. 1 except that the voltage responsive means other than the thyristor are used in common for both circuits. Thus the gate of thyristor 70 is connected to the same point as the gate of a thyristor 700 which serves the same function for the alternate half-waves. It will be noted that components which are the same in FIGS. 1 and 2 have the same reference numerals, while the additional circuit has components whose reference numeral is multiplied by 100 relative to the corresponding reference numeral of the first circuit. To be more specific, the circuit shown in FIG. 2 and having the same reference numerals is identical to that shown in FIG. 1 except that a diode 90 is inserted between the common point of capacitor 82, thyristor 70 and diode 72 on the one hand and the first output terminal on the other hand. The second circuit has a voltage doubling capacitor 820 which has one terminal connected to the second input terminal and a second terminal connected to the cathode of a thyristor 700 whose gate is connected to a common point with the gate 701 of thyristor 70. A diode 720 is connected in parallel with capacitor 820. The common point of the parallel circuit of capacitor 820 and diode 720 is connected to the cathode of a diode 91 whose anode is connected to the first output terminal. A diode 710 has an anode connected to the first input terminal and a cathode connected to the second output terminal. No separate output capacitor is utilized, the capacitor 81 serving as output capacitor for both the first and second circuits. The function of diodes 90 and 91 is to decouple voltage doubling capacitor 82 from voltage doubling capacitor 820 and vice versa. The operation of the second circuit will not be described since it is identical to that described with reference to FIG. 1 but operates on the alternate half-waves.

Figure 3:
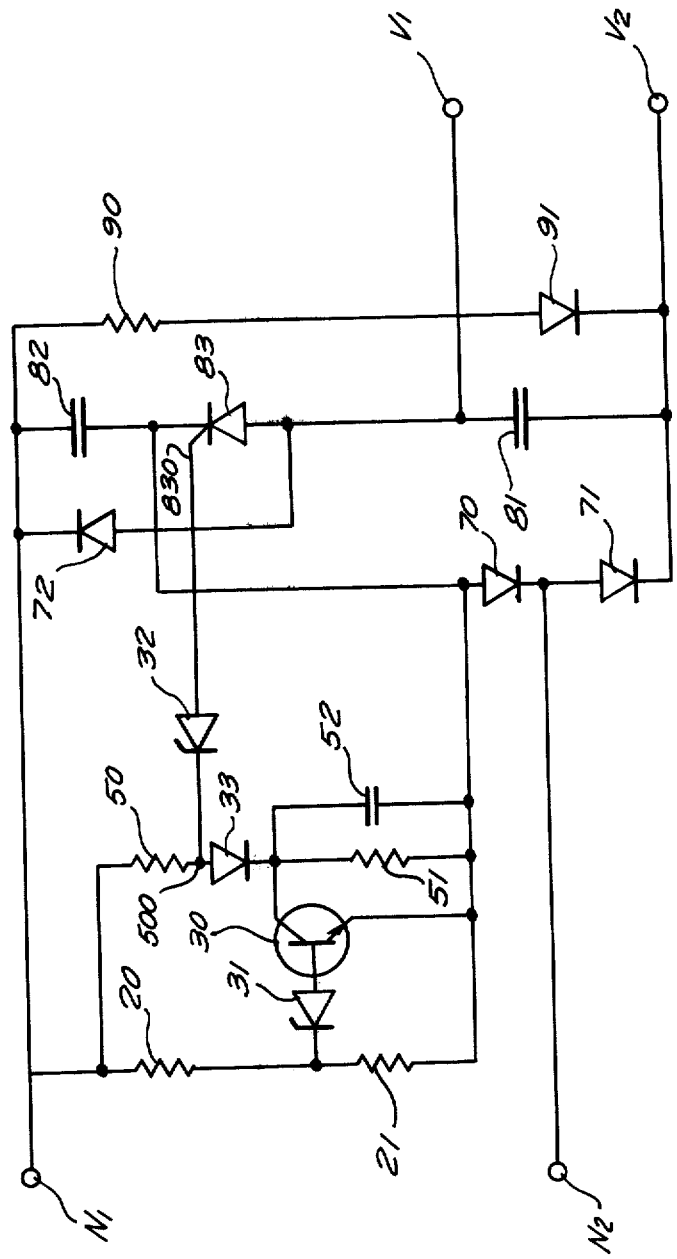
FIG. 3 is an alternate embodiment of the present invention using half-wave doubling but having increased protection against overvoltages.

In FIG. 3 the voltage doubler capacitor 82 and the output capacitor 81 are connected by a thyristor 83 whose anode is connected to capacitor 81 and whose cathode is connected to capacitor 82. A diode 72 has an anode connected to the anode of thyristor 83 and a cathode connected to terminal $N_1$. Diode 72 therefore is connected in parallel with capacitor 82 and thyristor 83. The series connection of thyristor 83 and output capacitor 81 has connected in parallel therewith the series connection of a diode 70 and a diode 71. Specifically the anode of diode 70 is connected to the common point of capacitor 82 and thyristor 83, while the cathode of diode 71 is connected to the second output terminal, $V_2$. The second input terminal $N_2$ is connected to the common point of the cathode of diode 70 and anode of diode 71. The voltage divider comprising a series connection of resistors 20 and 21 is connected from the input terminal $N_1$ to the anode of diode 70 and thus forms a DC path between the input terminals $N_1$ and $N_2$. The first voltage divider tap, namely the common point of resistors 20 and 21 is connected to the cathode of a Zener diode 31 whose anode is connected to the base of a transistor 30. Zener diode 31 forms part of the voltage responsive means as does thyristor 83 and transistor 30. The emitter of transistor 30 is connected to the anode of diode 70. Connected in parallel with the emitter-collector circuit of transistor 30 is the parallel circuit connection of a resistor 51 and capacitor 52, herein referred to as a parallel RC circuit. Further, the collector of transistor 30 is connected to the cathodes of a diode 33 whose anode is connected to input terminal $N_1$ through a resistor 50. Connected to the second voltage divider tap a terminal marked 500, is the cathode of a second Zener diode 32 whose anode is connected to the gate of thyristor 83. The gate has reference numeral 830.

Zener diode 32 which is part of the voltage sensitive means connects the gate of thyristor 83 to the second voltage divider terminal. Depending upon the condition of transistor 30, that is depending on whether transistor 30 is conductive or non-conductive, the voltage at terminal 500 either is, or is not, respectively, sufficient to switch thyristor 83 to the conductive state. Whether transistor 30 is or is not conductive depends upon whether the voltage applied at the input terminals is the second or first AC voltage respectively.

The parallel RC circuit of resistor 51 and capacitor 52 has a time constant which is sufficiently large, that independent of the AC component of the voltage is at terminals 500 and at the first voltage divider terminal, thyristor 83 will not fire when the voltage applied at terminals $N_1$, $N_2$ is the second AC voltage. Zener diodes 31 and 32 of course serve to define the exact point at which transistor 30 and thyristor 83 respectively are fired.

A discharge path must also be provided for capacitor 82 so that this capacitor does not remain in a charged condition following operation at the lower AC voltage. For this purpose a series circuit comprising a resistor 90 and a diode 91 is connected from terminal $N_1$ to terminal $V_2$. This circuits allows dissipation of the charge possibly remaining on capacitor 82 through the equipment connected to terminals $V_1$, $V_2$ and thyristor 83. Thus after the plug has been pulled, that is after terminals $N_1$, $N_2$ have been pulled from the outlet, capacitor 82 will discharge. This discharge is accomplished by a circuit which will not consume power during normal operation of the equipment, since no potential differences of the required polarity to render diode 91 conductive exists during that time.

Figure 4:
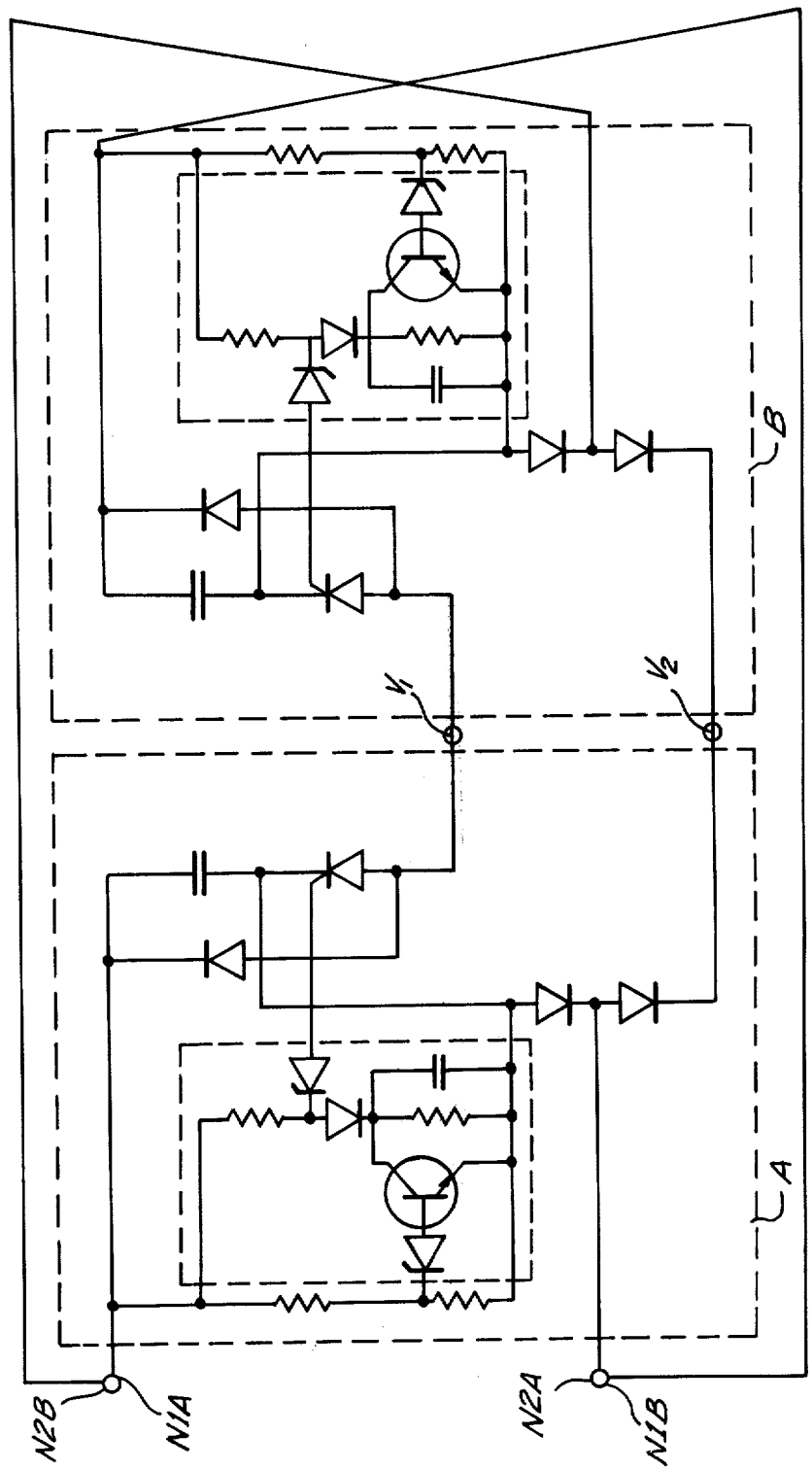
FIG. 4 is a further preferred embodiment of the present invention utilizing full-wave voltage doubling with increased protection against over voltages.

FIG. 4 shows two arrangements of FIG. 3 connected together to form a full-wave voltage doubler circuit. Specifically, terminal $V_1$ of one arrangement such as shown in FIG. 3 is connected to terminal $V_1$ of the other arrangement and the corresponding terminals $V_2$ are also connected together. However, the inputs terminals are connected in phase opposition, that is the terminal $N_2$ of the first arrangement is connected to terminal $N_1$ of the second arrangement and vice versa. The DC voltage created from terminal $V_1$ to terminal $V_2$ has extremely low AC components and it is therefore possible to dispense with output capacitors such as capacitor 81 of FIG. 3. It is further possible to dispense with the discharge circuit, namely resistor 90 and diode 91 as shown in FIG. 3.

While the invention has been illustrated and described as embodied in specific voltage responsive and voltage doubler circuits, it is not intended to be limited to the details shown, since various structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A system for automatically adapting equipment requiring a determined DC operating voltage for energization by a first or second AC voltage, said second AC voltage having substantially twice the amplitude of said first AC voltage, said system having a first and second input terminal for receiving said AC voltage and a first and second output terminal for furnishing said determined DC operating voltage, comprising, in combination, output rectifier means for rectifying the applied AC voltage and furnishing a corresponding DC voltage, said DC voltage constituting said operating voltage when said AC voltage is said second AC voltage, said output rectifier means comprising a first diode having a cathode connected to said first input terminal and an anode connected to said first output terminal, and a second diode having an anode connected to said second input terminal and a cathode connected to said second input terminal; voltage doubler circuit means for doubling said corresponding DC voltage when connected to said output rectifier means, said voltage doubler circuit means comprising a voltage doubler capacitor connected in parallel to said first diode; and voltage responsive means responsive to the applied AC voltage for connecting said voltage doubler circuit means to said rectifier means when said AC voltage is said first AC voltage and for disconnecting said voltage doubler means from said rectifier means when said AC voltage is said second AC voltage, said voltage responsive means comprising input rectifier means for rectifying said AC voltage and furnishing a corresponding DC measurement voltage, and switch means having a first state when said DC measurement voltage corresponds to said first AC voltage and a second state when said DC measurement voltage corresponds to said second AC voltage, and an output capacitor connected from said first to said second output terminal.

2. A system as set forth in claim 1 wherein said switch means comprise a thyristor having an anode connected to said anode of said first diode, a cathode connected to said anode of said second diode and a gate connected to said input rectifier means.

3. A system as set forth in claim 2, wherein said input rectifier means comprise an input diode, a capacitor connected in series to said input diode, and a resistor connected in series to said capacitor.

4. A system as set forth in claim 3, wherein said input rectifier means further comprise first voltage divider means connected in parallel to said resistor-capacitor of said input rectifier means and having a first voltage divider tap for furnishing a measuring voltage corresponding to said AC voltage energizing said equipment; and wherein said switch means further comprise second voltage divider means connected in parallel with said resistor and capacitor of said input rectifier means and having a second voltage divider tap for furnishing a second measuring voltage corresponding to said AC voltage applied to said input terminals, a transistor having a gate connected to said first voltage divider tap and an emitter-collector circuit connected from said second voltage divider tap to said second input terminal, for short-circuiting said second measuring voltage when said first measuring voltage corresponds to said first AC voltage; and connecting means for connecting said second voltage divider tap to said gate of said thyristor.

5. A system as set forth in claim 4, wherein said connecting means comprise a glow tube.

6. A system as set forth in claim 5, further comprising a parallel resistor-capacitor circuit, a diode connected in series with said parallel resistor-capacitor circuit thereby forming a series circuit, and means for connecting said series circuit in parallel with said emitter-collector circuit of said transistor.

7. A system as set forth in claim 5, wherein said second voltage divider means comprise a resistor, and a capacitor connected in parallel with said emitter-collector cicuit of said transistor.

8. A system for automatically adapting equipment requiring a determined DC operating voltage for energization by a first or second AC voltage, said second AC voltage having substantially twice the amplitude of said first AC voltage, said system having a first and second input terminal for receiving said AC voltage and a first and second output terminal for furnishing said DC voltage, comprising, in combination, output rectifier means for rectifying the applied AC voltage and furnishing a corresponding DC voltage, said DC voltage constituting said operating voltage when said AC voltage is said second AC voltage, said output rectifier means comprising a first and second halfwave rectifier circuit connected to form a fullwave rectifier circuit, said first half-wave rectifier circuit comprising a first and second diode having, respectively, a cathode and an anode connected to said first and second input terminal, said second halfwave rectifier circuit comprising a first and second diode having, respectively, an anode and a cathode connected to said first and second input terminal; voltage doubler circuit means for doubling said corresponding DC voltage when connected to said output rectifier means, said voltage doubler circuit means comprising a first and second voltage doubler capacitor connected, respectively, in parallel with said first diode of said first halfwave rectifier circuit and said second diode of said second halfwave rectifier circuit; and voltage responsive means responsive to said applied AC voltage for connecting said voltage doubler circuit means to said rectifier means when said AC voltage is said first AC voltage and for disconnecting said voltage double circuit means from said rectifier means when said AC voltage is said second AC voltage, said voltage responsive means comprising means for connecting said first and second voltage doubler element to said first and second half-wave rectifier circuit respectively when said AC voltage energizing said equipment is said first AC voltage.

9. A system as set forth in claim 8, wherein said voltage responsive means comprise input rectifier means for furnishing a measuring voltage corresponding to said AC voltage energizing said equipment, and a first and second thyristor responsive to said measuring voltage for connecting said first and second voltage doubler capacitor to said first and second half wave rectifier circuits respectively when said measuring voltage corresponds to an AC voltage substantially equal to said first AC voltage.

10. A system as set forth in claim 9, wherein said first and second thyristor each have an anode; further comprising a first and second buffer diode each having an anode connected to said first output terminal and a cathode connected to said anode of the corresponding one of said thyristors.

11. A system for automatically adapting equipment requiring a determined DC operating voltage for energization by a first AC voltage or a second AC voltage having substantially twice the amplitude of said first AC voltage, said system having a first and second input terminal for receiving said AC voltage and a first and second output terminal for furnishing said determined DC operating voltage, comprising, in combination, an output capacitor connected from said first to said second output terminal; output rectifier means for rectifying the applied AC voltage and furnishing a corresponding DC voltage, said DC voltage constituting said operating voltage when said AC voltage is said second AC voltage, said output rectifier means comprising a first diode having an anode connected to said first output terminal and a cathode connected to said first input terminal, and a second diode having an anode connected to said second input terminal and a cathode connected to said second output terminal; voltage doubler circuit means for doubling said corresponding DC voltage when connected to said output rectifier means, said voltage doubler circuit means comprising a voltage doubler capacitor having a first terminal connected to said first input terminal and a second terminal; and voltage responsive means responsive to said applied AC voltage for connecting said voltage doubler circuit means to said rectifier means when said AC voltage is said first AC voltage and for disconnecting said voltage doubler means from said rectifier means when said AC voltage is said second AC voltage, said voltage responsive means comprising switch means for connecting said second terminal of said voltage doubler capacitor to said first output terminal when said AC voltage is said first AC voltage and for disconnecting said second terminal of said voltage doubler capacitor from said first output terminal when said AC voltage energizing said equipment is said second AC voltage.

12. A system as set forth in claim 11, wherein said switch means comprise a thyristor having an anode-cathode circuit connected from said voltage doubler to said output capacitor said thyristor further having a gate; wherein said voltage responsive means further comprise input rectifier means connected from said first to said second input terminal for furnishing a DC voltage corresponding to said AC voltage energizing said equipment; and control circuit means connected to said input rectifier means and said gate of said thryistor, for connecting said gate of said thyristor to said cathode of said thyristor when said DC voltage corresponds to said second AC voltage and for connecting said gate of said thyristor to said input rectifier thereby gating said thyristor to the conductive state, when said AC voltage is said first AC voltage.

13. A system as set forth in claim 12, wherein said input rectifier means comprise a first and second voltage divider having, respectively, a first and second voltage divider tap; wherein said control circuit means comprise input switch means having a control electrode connected to said first voltage divider tap, for short-circuiting the voltage at said second voltage divider tap when the voltage at said first voltage divider tap corresponds to said second AC voltage; further comprising a Zener diode for connecting the gate of said thyristor to said second voltage divider tap.

14. A system as set forth in claim 13, wherein said second voltage divider comprises a resistor having one terminal connected to said first input terminal and a second terminal connected to said second voltage divider tap, a rectifier having an anode connected to said voltage divider tap and a cathode, a parallel resistor-capacitor circuit having a first terminal connected to said cathode of said rectifier and a second terminal, and an additional rectifier having an anode connected to said second terminal of said parallel resistor-capacitor circuit and a cathode connected to said second input terminal; and wherein said control circuit means comprise a transistor having a gate connected to said first voltage divider terminal and an emitter-collector circuit connected in parallel with said parallel resistor-capacitor circuit, and a Zener diode connected between said gate of said thyristor and said second voltage divider tap.

15. A system as set forth in claim 13, further comprising an additional Zener diode interconnected between said gate of said transistor and said first voltage divider tap.

16. A system as set forth in claim 13, further comprising a series circuit including a resistor and a diode connected from said first input terminal to said second output terminal.

17. A system as set forth in claim 15, further comprising a second system identical to said system, and means for connecting the input terminals of said system and said second system together but with reverse polarity and means for connecting the output terminals to said second system directly to said output terminals.

18. A system having a first and second input terminal for receiving an AC voltage having a first amplitude or a second amplitude substantially twice said first amplitude, and a first and second output terminal for furnishing a DC operating voltage having a predetermined amplitude in response to said AC voltage independent of the amplitude thereof, comprising, in combination, an output capacitor connected between said first and second output terminal; a voltage doubler capacitor having a first terminal connected to said first input terminal and a second terminal; switch means having a main conducting circuit connected in series between said output capacitor and said voltage doubler capacitor, said switch means further having a control electrode; a first diode connected in parallel with said main conducting circuit and said voltage doubler capacitor; a second diode connected from said second terminal of said voltage doubler capacitor to said second input terminal; a third diode connected from said second input terminal to said second output terminal; and voltage responsive means connected to said first input terminal and said control electrode of said switch means for switching said switch means to the conductive state when said AC voltage has said first amplitude and for maintaining said main conducting circuit in the nonconductive state when said AC voltage has said second amplitude.

19. A system as set forth in claim 18, wherein said switch means comprise a thyristor having an anode connected to said output capacitor and a cathode connected to said voltage doubler capacitor; wherein said first diode has an anode connected to said output capacitor and a cathode connected to said first input terminal; and wherein said second and third diode are connected in series with the same polarity, the anode of said second diode being connected to said cathode of said thyristor and the cathode of said second diode being connected to said second output terminal.

* * * * *